May 27, 1930.  P. J. SULLIVAN  1,760,671
HOIST FOR AUTOMOBILES AND THE LIKE
Filed Sept. 26, 1928
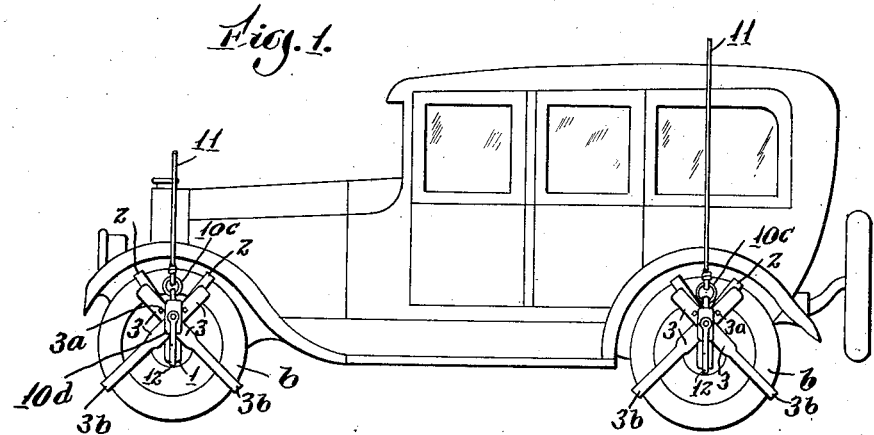
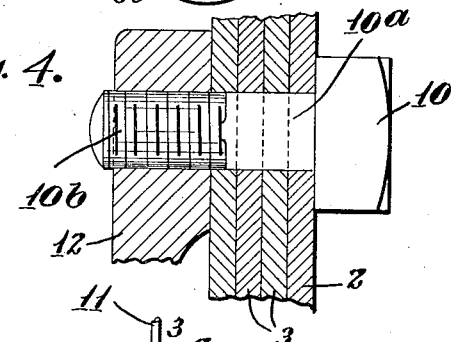
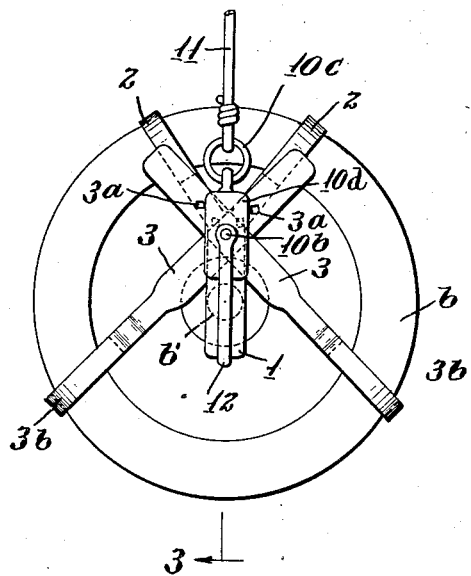
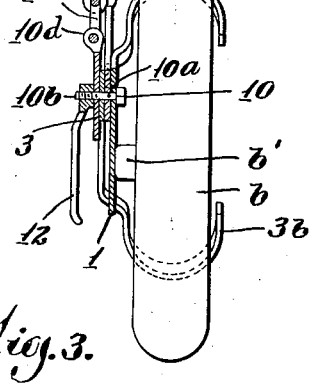
Inventor
P. J. Sullivan
by Geo. N. Goddard
Attorney Patented May 27, 1930

1,760,671

UNITED STATES PATENT OFFICE

PATRICK J. SULLIVAN, OF BOSTON, MASSACHUSETTS

HOIST FOR AUTOMOBILES AND THE LIKE

Application filed September 26, 1928. Serial No. 308,360.

This invention relates to apparatus for the hoisting of such structures as automobiles or other wheeled vehicles and is intended to provide a simple and reliable device of this kind which shall be capable of easy handling when loading or unloading automobiles from vessels or other places.

The hoisting tackle heretofore in use for such purposes comprises a horizontal rectangular frame with suspension ropes carrying grappling hooks for grappling the wheels of the vehicle, but objection is made to such devices on the ground that they are very likely to scratch, mar or bruise the vehicle and are subject to accidental disengagement in case of the sway or pitching of the car as it is carried rapidly by the hoist into or out of the hold of a vessel.

My present improvement relates particularly to the grappling devices suspended from the hoisting ropes of a suitable hoisting apparatus, and comprise essentially a series of wheel-embracing arms disposed in angular relation to each other combined with a suspension member to which said arms are securely but detachably fastened by means preventing the angular displacement of the grappling arms when the device is applied to a wheel.

This and other features of the invention will be described in the specification and will be defined in the claims hereto annexed.

In the accompanying drawings I have illustrated the preferred form embodying the principles of this invention, in which Fig. 1 is a side elevation showing the near side of a motor car with two of the suspending grapples applied to the front and rear wheels respectively.

Fig. 2 is an enlarged detail showing the construction of the completely assembled grappling member when applied to the wheel structure.

Fig. 3 is a vertical central section of the device at right angles to the plane of Fig. 2.

Fig. 4 is an enlarged detail showing the means for fastening the several arms and the suspension member together to prevent relative rotation.

In the practice of the invention as illustrated in the drawings I provide a series of radiating arms, whose inner portions lie in flat vertical planes when the device is assembled, and whose outer portions are laterally offset and inwardly turned to form upper and lower wheel-embracing claws or grappling hooks which overlap the upper portion of the wheel periphery above the hub level and which, at their points of intersection somewhat above the hub level, are detachably interlocked together by means of a penetrating locking bolt common to all the parts passing through corresponding holes of a series, which permit the enlargement or the decrease in the overall dimensions to accommodate wheel structures of different sizes.

The member which overlaps the upper portion of the tire or wheel structure comprises a flat heavy strip 1 of steel or suitable material provided with upwardly forked or diverging extensions 2, turned inwardly to form wheel-overlapping hooks or claws which, by reason of the bend at $2^a$, lie in a plane offset from the plane of the common shank member 1.

In practice this wheel-overlapping claw member is hooked over the upper portion of the wheel beneath the mud guard, so that the offset lower portion will stand out beyond the edge of the mud guard in order that the suspension cable or chain may not touch the mud guard. At its middle portion the points where the axes of the diverging hooks cross each other, the shank portion 1 is provided with a square or polygonal hole for receiving the square portion $10^a$ of the shank of a fastening bolt 10 which is inserted there-through with the head inward and the threaded portion of the shank $10^b$ projecting outward. The wheel-underlapping grappling arms 3 are preferably provided with a plurality of square holes through the straight flat shank portions $3^a$ and at their outer ends are provided with offset hook members $3^b$ for embracing the lower portion of the tire. The sides of the square holes formed in the flat shank portions of these lower wheel-underlapping members of the device have their sides oblique to the axes of the members 3, so that when they are fitted over the square portion of the bolt they will stand at the proper angle to each other, as shown in the drawings, to make a sling or cradle beneath the lower portion of the wheel structure or tire *b*.

When the arms 3 have been positioned upon the interlocking bolt 10, through the holes that are appropriate to the size of the wheel structure to which they are being applied, the suspension member, which is also provided with a square bolt-receiving aperture, is then placed over the outer end of the bolt.

This suspension member comprises a heavy flat plate 10$^d$ provided at its upper end with a pivoted suspension ring 10$^c$ to which the hoisting cable 11 is secured. When the parts are thus assembled in their correct relations, as determined by the square portion of the bolt shank, a clamping member or lever 12, having a threaded hub portion adapted to engage the threaded portion 10$^b$ of the bolt 10, is then applied, this threaded lever being turned on to the screw thread like a nut to clamp the four separate members that comprise the grappling device firmly together.

It will be seen that there is no necessity of jacking up the wheel to apply the device, yet the wheel is positively embraced in a series of radiating claws whose proper relationship is maintained to prevent their opening under stress and allowing the wheel to drop through. With the device properly applied it is absolutely impossible for the wheel to escape from the embracing grappling arms, while at the same time as the grapple hooks touch nothing but the tire of the wheel the suspension portion of the structure is offset sufficiently to prevent rubbing or chafing against the edge of the mud guard. The entire structure forms a collapsible spider that is readily applied and readily removed from the wheel, yet when properly assembled on the wheel is positively held against any collapsing movement that would allow the escape of the wheel.

What I claim is:

1. A grappling device for hoisting apparatus embracing in its construction a suspension member adapted to be attached to a suspension cable, a plurality of radiating arms detachably secured to said suspension member in fixed angular relation to one another, said arms being provided at their outer ends with inwardly turned hook-like claws adapted to embrace a wheel periphery, means for clamping said arms and said suspension member together, said means preventing angular displacement of the arms with relation to one another when so clamped together.

2. A grappling device for hoisting apparatus embracing in its construction a suspension member, a plurality of radiating arms secured thereto, said arms being provided at their outer ends with wheel-embracing claws and being also provided with polygonal bolt-receiving apertures, a clamping bolt having a polygonal shank portion adapted to pass through and fit the apertures in said arms when brought into registry with an aperture in the suspension, thereby preventing angular displacement of the wheel-embracing arms in relation to one another.

3. A grappling device embracing a plurality of radiating arms provided at their outer ends with inwardly turned offset wheel-embracing claws, a suspension member adapted to be secured to a suspension cable, said arms and suspension member being provided with polygonal apertures adapted to be brought into registry with one another when the device is assembled, and clamping means for fastening the arms and suspension member securely together in fixed angular relation, said clamping means comprising a bolt having a polygonal shank portion adapted to pass through polygonal apertures in their respective arms and suspension member to prevent rotative displacement, and an internally threaded clamping lever having threaded engagement with the outer portion of the bolt to secure the arms and suspension member in operative position and lock them against angular displacement with relation to one another.

4. A grappling device for a hoisting apparatus embracing a plurality of radiating arms having claws for embracing the periphery of a wheel structure, a suspension member, a common fastening bolt securing said arms and said suspension member together in proper assembled position and interlocking them positively against relative displacement, said arms having each a plurality of bolt-receiving holes to permit them to be assembled to embrace wheel structures of different sizes.

In witness whereof, I have subscribed the above specification.

PATRICK J. SULLIVAN.